United States Patent [19]

Matsuoka et al.

[11] Patent Number: 5,578,218
[45] Date of Patent: Nov. 26, 1996

[54] BRINE TREATMENT METHOD

[75] Inventors: Terumi Matsuoka; Masahiro Ohara, both of Okayama; Izumi Kawamura, Tamano, all of Japan

[73] Assignee: Chlorine Engineers Corp., Ltd., Japan

[21] Appl. No.: 514,624

[22] Filed: Aug. 14, 1995

[30] Foreign Application Priority Data

Aug. 30, 1994 [JP] Japan ................................. 6-228935

[51] Int. Cl.$^6$ ........................................... C02F 1/42
[52] U.S. Cl. ........................ 210/672; 210/683; 210/670
[58] Field of Search ................................. 210/670, 672, 210/679, 683

[56] References Cited

U.S. PATENT DOCUMENTS

| | | | |
|---|---|---|---|
| 4,405,576 | 9/1983 | Lee et al. | 423/181 |
| 4,415,677 | 11/1983 | Lee et al. | 521/28 |
| 4,415,678 | 11/1983 | Lee et al. | 521/28 |
| 4,488,949 | 12/1984 | Lee et al. | 521/28 |
| 4,692,431 | 9/1987 | Weller | 210/683 |
| 4,855,059 | 8/1989 | Frianeza-Kullberg | 210/670 |
| 5,071,563 | 12/1991 | Shiga et al. | 210/670 |

FOREIGN PATENT DOCUMENTS

| | | |
|---|---|---|
| 60-44056 | 3/1985 | Japan . |
| 60-228691 | 11/1985 | Japan . |
| 3153522 | 7/1991 | Japan . |
| 4300652 | 10/1992 | Japan . |

Primary Examiner—Cynthia L. Nessler
Attorney, Agent, or Firm—Lorusso & Loud

[57] ABSTRACT

In a brine treatment method of removing sulfate ions from sulfate-ion contained brine, sulfate-ion contained brine is brought into dispersive contact with granular ion exchange resin carrying zirconium hydrous oxide thereon in a fluid state under an acidic condition to thereby cause the sulfate ions to be adsorbed by the ion exchange resin and removed from the brine, then the granular ion exchange resin is washed with aqueous solution whose pH value is equal to or lower than a pH value in the adsorbing step, thereby removing chloride ions from the granular ion exchange resin, then in a fluid state, the granular ion exchange resin adsorbing the sulfate ions is brought into dispersive contact with aqueous solution of pH value higher than the pH value in the adsorbing step, thereby desorbing the adsorbed sulfate ions from the granular ion exchange resin, and then the granular ion exchange resin is washed with water.

17 Claims, 3 Drawing Sheets

BRINE TREATMENT METHOD

BACKGROUND OF THE INVENTION

1. Field of the Invention

The present invention relates to a treatment method for brine (salt water), and particularly to a brine treatment method for removing sulfate ions which are contained in brine containing alkali raw material such as sodium chloride or the like, or alkaline earth metal chloride, and at the same time withdrawing chloride ions to suppress loss of the alkali raw material or alkaline earth metal chloride.

2. Description of Related Art

In a process of electrolyzing brine which is solution of alkali or alkaline earth metal chloride to thereby produce chlorine, hydrogen and alkaline metal hydroxide, it has been known that sulfate ions which are contaminated as impurities in alkali raw material or alkaline earth metal chloride adversely affects an electrolysis capability, and thus removal of the sulfate ions has been performed from brine in this process. As a conventional method of removing sulfate ions from brine have been utilized various methods such as a method of removing sulfate ions as barium salt (barium sulfate), calcium salt (calcium sulfate) or the like, a refrigerating method and a salt-water purge method. However, when sulfate ions are removed with high efficiency by these methods, various problems such as cost-up, etc. occur. In order to improve the industrial efficiency of the sulfate ion removing process, various proposals have been recently made to remove sulfate ions using an ion exchange treatment. For example, these proposals are disclosed in Japanese Laid-open Patent Application NO. Sho-60-44056, Japanese Laid-open Patent Application No. Sho-60-228691, Japanese Laid-open Patent Application No. Hei-3-153522 (U.S. Pat. No. 5,071,563), Japanese Laid-open Patent Application No. Hei-4-300652, U.S. Pat. No. 4,415,677, U.S. Pat. No. 4,415,678, etc.

In the method as proposed in Japanese Laid-open Patent Application No. Sho-60-228691, brine containing sulfate ions is diluted, and then passed through anion exchange resin beads or powder so that the sulfate ions are adsorbed by the anion exchange resins and thus removed from the brine. Thereafter, the anion exchange resin in which the sulfate ions have been adsorbed is washed with dense brine to cause the sulfate ions to be adsorbed by the anion exchange resin and remove the sulfate ions. In this method, sulfate ions contained in dilute brine which is emitted from an electrolytic cell are adsorbed and condensed by ion exchange resins, and it is applied to the conventional calcium method. Therefore, the cost of this method is higher than the conventional method, and thus there is a problem industrially.

Furthermore, in the methods as proposed in Japanese Laid-open Patent Application No. Sho-60-44056, U.S. Pat. No. 4,415,677 and U.S. Pat. No. 4,415,678, macroporous cation exchange resins carrying amorphous polymeric or polymeric zirconium hydrous oxide is filled in a packed column, and then salt-water is allowed to flow through the packed column in a fixed state to remove sulfate ions. In this method, since an adsorbing treatment is carried out in a fixed bed, polymeric zirconium hydrous oxide which has already adsorbed sulfate ions comes into contact with brine of high acidity in the neighborhood of a salt-water inlet part of the packed column. Therefore, the polymeric zirconium hydrous oxide is dissolved in the acid, and thus a large amount of polymeric zirconium hydrous oxide is lost, so that a maintenance cost may be increased. When the adsorption treatment is performed with a high pH value to prevent dissolution of zirconium, a removing rate of sulfate ions is reduced, and thus it is not efficient. In addition, since the adsorbed sulfate ions are desorbed from the polymeric zirconium hydrous oxide with water, a regeneration efficiency is low and both sodium sulfate and alkali raw material or alkaline earth metal chloride are desorbed, so that loss of raw material chloride is great. Therefore, this method is ineffective economically. In addition, this method is unsuitable for such a present situation that restriction is imposed on discharge of chloride ions. On the other hand, when alkali is used for the desorption treatment, the desorption efficiency is high, however, aqueous solution having a high pit value and polymeric zirconium hydrous oxide are contacted with each other, so that there occurs a cation ion exchange reaction in which polymeric zirconium hydrous oxide adsorbs sodium ions. Therefore, acid or alkali whose amount is twice as large as a theoretical amount required to remove sulfate ions must be used, and this is industrially unfavorable.

Further, in the methods as proposed in Japanese Laid-open Patent Application No. Hei-3-153522 and Japanese Laid-open Patent Application No. Hei-4-300652, zirconium hydrous oxide powder containing a small amount of water is directly used, and it is contacted with sulfate-ion contained brine in a slurry state to adsorb and remove sulfate ions. The zirconium hydrous oxide which adsorbs the sulfate ions is contacted with alkali in aqueous solution to be regenerated. This method is more excellent than the method proposed in Japanese Laid-open Patent Application No. Sho-60-44056, etc. because the various problems as described above, such as the low regeneration efficiency, the increase of an amount of acid or alkali to be used and the loss of polymeric zirconium hydrous oxide in the adsorption process of sulfate ions, can be overcome by this method. However, this method needs to separate zirconium hydrous oxide, and it has new problems, for example, it needs a facility cost for a separation device such as a filter, etc., a maintenance cost, operators, etc. Furthermore, zirconium hydrous oxide powder and brine are contacted with each other in a slurry state by stirring or pump-circulation, so that the zirconium hydrous oxide powder intensively impinges on a stirrer or an impeller of a pump. Therefore, the powder may be ground or crushed to be pulverized. In this case, the pulverized zirconium hydrous oxide may be discharged to the outside of a system, and thus the loss amount is increased. Still furthermore, there occurs little adsorption of raw material chloride because no ion exchange resin is used, however, the raw material chloride may be discharged together with sulfate ions at the desorption time like Japanese Laid-open Patent Application No. Sho-60-44056.

SUMMARY OF THE INVENTION

The inventors of this application have considered the foregoing problems of the conventional method in which sulfate ions are removed from brine with an ion exchange treatment which has been hitherto proposed, and have achieved the present invention by developing a salt-water treatment method which is stable, more economical and highly industrial.

An object of the present invention is to provide a method of treating brine more stably and economically and highly industrially.

In order to attain the above object, a brine treatment method of removing sulfate ions from brine containing sulfate ions comprises the following four steps: (1) a sulfate ion adsorbing step in which brine (aqueous solution containing alkali or alkaline earth metal salt) containing sulfate ions is dispersively contacted with granular ion exchange resin (particles) carrying zirconium hydrous oxide thereon in a fluid state under an acidic condition, whereby the sulfate ions are adsorbed by the ion exchange resin and removed from the brine, (2) a chloride ion removing step in which the granular ion exchange resin is washed with aqueous solution whose pH value is equal to or lower than a pH value in the adsorbing step after the adsorbing step, thereby removing chloride ions, (3) a sulfate ion desorbing step in which the granular ion exchange resin adsorbing the sulfate ions in the chloride ion removing step is dispersively contacted in a fluid state with aqueous solution of pH value which is higher than the pH value in the adsorbing step, thereby desorbing the adsorbed sulfate ions from the granular ion exchange resin, and (4) a desorption water-washing step in which the granular ion exchange resin is washed with water after the desorbing step.

In the brine treatment method, the steps (1) to (4) as described above may be sequentially repetitively performed using a treatment bath, or separately and independently performed using plural treatment baths. As the granular ion exchange resin may be used at least one material selected from the group consisting of strong acid type cation exchange resin, weak acid type cation exchange resin and chelate resin. Preferably, strong acid type cation exchange resin having sulfonic group is used. Both gel type ion exchange resin and macro-porous type ion exchange resin may be used, and the gel type is preferably used to reduce the loss of raw material chloride. The pH value in the sulfate ion adsorbing step and the chloride ion removing step is set to 1 to 5, and the pH value in the sulfate ion desorbing step and the desorption water washing step is set to 5 to 10.

In the method of the present invention, the fluid state is established by rotational force providing means. The rotational force providing means may comprise a stirrer, and the stirrer is disposed so that its stirring vanes are not contacted with the granular ion exchange resin. In this case, it is preferable that the inside of the brine treatment bath is sectioned into at least two parts by a fluid-permeable partition member through which fluid (liquid) can pass, and the stirring vanes are disposed in sectional parts other than a sectional part in which the granular ion exchange resin is held, whereby the fluid state can be formed through the stirring while the granular ion exchange resin is prevented from being contacted with the stirring vanes. The fluid state may be formed by introducing gas bubbles or by introducing brine into a packed column in which the granular ion exchange resin is filled.

In this invention, the "dispersive contact" in the fluid state of the fluid is defined as follows: in a treatment area where brine or aqueous solution containing sulfate ions and granular ion exchange resin carrying zirconium hydrous oxide coexist with each other and are dispersively contacted with each other, the brine and the granular ion exchange resin are not stationary and are kept motional at all times by motion of fluid which is induced by flow of the fluid, etc. without disposing a mechanical fluidizing means, so that both the brine and the granular ion exchange resin are uniformly mixed and contacted with each other while dispersed into each other. Usually, the brine and the granular ion exchange resin are kept to be motional at a moving speed of about 0.001 m/second or more.

According to the present invention, in the sulfate ion adsorbing and desorbing steps, the granular ion exchange resin carrying zirconium hydrous oxide is dispersed in sulfate ion containing brine or aqueous solution and kept in a slurry and fluid state. Therefore, the contact efficiency can be remarkably improved. Furthermore, the granular ion exchange resin are not contacted with the stirring vanes or the impellers of the pump and are kept in a fluid state at the dispersive contact time. Therefore, the granular ion exchange resin carrying zirconium hydrous oxide which acts as adsorbent and desorbent for sulfate ions can be prevented from being mechanically pulverized and discharged to the outside of the system, so that the loss of the granular ion exchange resin can be suppressed.

Furthermore, the brine and the granular ion exchange resin carrying zirconium hydrous oxide are dispersively contacted with each other to adsorb and remove sulfate ions, and then the sulfate ion adsorbed ion exchange resin is treated with aqueous solution under an acidic condition to remove adsorbed chloride ions in a chloride ion removing step. Therefore, the chloride ions as well as the sulfate ions are desorbed and discharged at a desorption treatment time in a subsequent sulfate ion desorbing step, so that a large amount of raw material chloride can be prevented from being lost. In any conventional method, no chloride ion removing step is provided after the adsorbing treatment, and the desorption treatment is carried out with water or alkali aqueous solution immediately after the adsorbing treatment. Accordingly, chloride ions as well as sulfate ions are discharged to the outside of the system, and thus a large amount of raw material chloride is lost in the conventional methods.

Still furthermore, the ion exchange resin which has been subjected to the adsorbing treatment can be treated under an acidic condition to selectively remove chloride ions. For this case, the inventors of this application have first found out that if a water washing treatment is used, sulfate ions as well as chloride ions flow out, and thus the purpose of removing the chloride ions cannot be achieved.

According to the present invention, zirconium hydroxide powder which is the adsorbent for sulfate ions is not directly used, and it is used while carried on the granular ion exchange resin (ion exchange particles), so that it can be easily treated after each treatment step as described above and thus the operation performance can be improved. Furthermore, the respective steps as described above are repeated in a predetermined single treatment bath or in separate treatment baths, so that a long-term treatment can be smoothly operated, and sulfate ions contained in brine can be stably and economically removed.

DETAILED DESCRIPTION OF THE PREFERRED EMBODIMENTS

Figure 1:
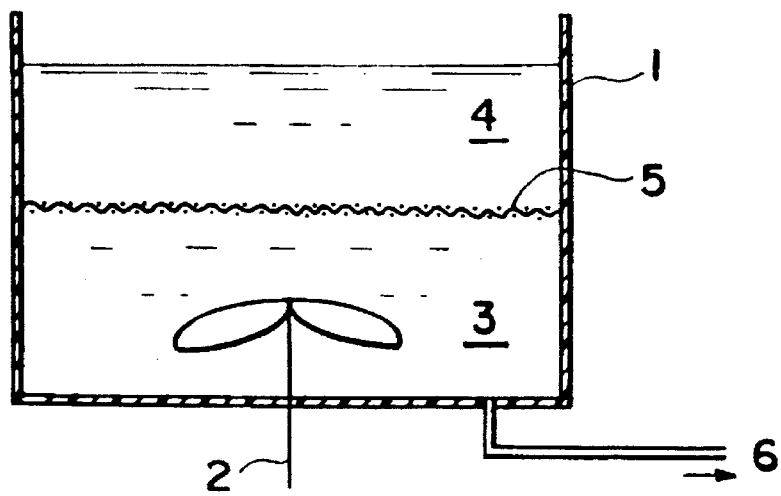
FIG. 1 is a diagram showing a two-chamber horizontally split bath in an embodiment of the present invention.

Preferred embodiments according to the present invention will be described thereunder with reference to the accompanying drawings.

Adsorbent for sulfate ions which is used in the brine treatment method of the present invention is obtained by carrying zirconium hydrous oxide in granular ion exchange resin, and thus it can be extremely more easily treated as compared with conventional powdery zirconium hydrous oxide which is hard to be treated after a adsorbing and desorbing treatment.

At least one material which is selected from the group consisting of strong acid type cation exchange resin, weak acid type cation exchange resin and chelate resin is used as the granular ion exchange resin carrying zirconium hydrous oxide. Particularly, strong acid type cation exchange resin having sulfonic group is preferable. Anion exchange resin has a low carry efficiency of zirconium hydrous oxide, and it suppresses selectivity of sulfate ion adsorption by zirconium hydrous oxide because the anion exchange resin also adsorbs and desorbs chloride ions.

Both of a gel type and a macro-porous type which are classified on the basis of a surface state can be used as the ion exchange resin. The gel type ion exchange resin is generally obtained by copolymerizing styrene and divinyl benzene (DVB). In the copolymerization process, unreacted monomers invade into a polymerization mesh structure and then polymerized in the structure, so that the monomers are ununiformly bridged and a gel-like structure is obtained. Accordingly, the gel type ion exchange resin corresponds to ion exchange resin obtained by introducing ion exchange groups into the copolymer having micro-pores in a polymerized mesh structure. On the other hand, the macroporous type ion exchange resin corresponds to ion exchange resin obtained by introducing ion exchange groups into a copolymer which is subjected to a predetermined porous-making treatment during the process of obtaining the gel type copolymer as described above so that it has macropores having a pore diameter of 20 to 100 nm. The macroporous type has a large specific surface area and a high exchange rate, however, its exchange capacity is smaller than the gel type. Particularly in the brine treatment, brine invades into the macropores, and thus chloride ions cannot be sufficiently removed in the chloride ion removing step after the adsorbing step. Therefore, a larger amount of raw material chloride is lost as compared with the gel type, and chloride ions as well as sulfate ions flow out at the desorbing time. Accordingly, when the cost of the raw material chloride is high or a regulation for discharge of chlorine is severe, the gel type is preferably used.

The average particle diameter of the granular ion exchange resin of the present invention is preferably set to 300 to 1200 µm. In this invention, zirconium hydroxide is carried on particles of the granular ion exchange resin in the above particle diameter range, so that it can be extremely more easily treated after each treatment process as compared with the powdery zirconium hydrous oxide.

When the average particle diameter is smaller than 300 µm, in such a bath type that the fluid state is formed by the rotational force providing means such as a stirrer or by introducing gas bubbles, a partition member having a fine mesh structure must be used as the partition member having a fluid-permeable portion in a treatment bath, resulting in increase of the flow resistance of the fluid and reduction in the stirring efficiency. Accordingly, this case is unfavorable. Furthermore, in such a type using a packed column, the packed column is bulky and thus it has a large capacity. In addition, the fluid state is greatly varied due to variation of the flow amount. Therefore, this case is also unfavorable.

On the other hand, when the average particle diameter is larger than 1200 µm, in the type using the rotational force providing means or gas bubble introduction, the adsorption and desorption rate of sulfate ions is reduced, and no uniformly dispersive slurry cannot be obtained because a sedimentation velocity is high. Therefore, the contact efficiency is lowered and the adsorption and desorption efficiency is also lowered. Accordingly, this case is also unfavorable. In the packed column type, circulation of a large amount of brine is required, and a large capacity (power) pump must be provided, so that the facility cost is increased. Therefore, this case is also unfavorable.

The granular ion exchange carrying zirconium hydroxide of the present invention can be obtained as follows. First, the granular ion exchange resin is contacted with aqueous solution containing zirconium ions to change functional groups of the ion exchange resin to zirconium type, and then it is contacted with alkaline solution containing ammonium, caustic alkaline metal, calcium hydroxide, tetraalkyl ammonium hydroxide or the like. In this case, suitable solution may be selected as the used alkali aqueous solution in consideration of safety, critical influence on an physical environment when it is discharged, economical efficiency, using conditions, etc.

For example, with respect to ammonium, it is weak base and thus it hardly reacts with zirconium hydrous oxide, so that ammonium is favorable because it can be easily removed from zirconium hydrous oxide. However, it is more expensive than sodium hydroxide, and nitrogen which is restrained in consideration an environmental pollution problem may be contaminated into discharged water at high concentration. On the other hand, sodium hydroxide is strong base, and thus it is liable to react with zirconium hydrous oxide. Therefore, it must be removed from zirconium hydrous oxide under an acidic condition, and thus a complicated operation is required. However, sodium hydroxide is generally favorable because it is cheaper than ammonium and there is no restrain problem of discharged water.

The amount of zirconium hydrous oxide to be carried on the granular ion exchange resin is suitably determined in the basis of a treatment capability, that is, an adsorption capability of sulfate ions which is required in accordance with treatment conditions such as the kind of the ion exchange resin, the treatment capacity, the amount of brine to be treated, etc. Furthermore, the carry amount of zirconium hydroxide can be adjusted by a carry frequency of zirconium hydroxide onto the ion exchange resin.

According to the inventors' study, it has been found out that the sulfate ion adsorbing capability (which is represented by a gram value of adsorbed sulfate ions per ion exchange resin of one liter) tends to be improved as the carry frequency is high, and the amount of ion exchange resin required to treat a constant amount of sulfate ions for a constant time is reduced as the sulfate ion adsorbing capability is improved, so that the facilities can be designed in a compact size and this is favorable. On the other hand, the increase of the carry frequency also increases the use amount of zirconium compound and alkali, resulting in increase of manufacturing cost of the granular ion exchange resin carrying zirconium hydrous oxide used in this invention. For example, when zirconium hydrous oxide is carried on strong acidic cation exchange resin, zironium oxychloride is used as the zirconium compound and it is carried on the cation exchange resin with aqueous solution of 2 mol/liter (hereinafter referred to as "carry operation"). When the carry operation is performed only once, the sulfate ion adsorbing capability is small, and thus a large facility and a large amount of resin are required. On the other hand, when the carry operation is performed three times or more, the facility cost and the use amount of the resin cannot be reduced to the extent that the carry cost can be offset. Accordingly, the carry frequency is most preferably set to twice. At any rate, the carry frequency must be determined on the basis of the synthetic judgment of not only the carry amount of zirconium hydroxide, but also the manufacturing cost of zirconium hydrous oxide carrying ion exchange resin, the total facility cost, etc.

In the sulfate ion adsorbing step of the present invention, the granular ion exchange resin carrying zirconium hydrous oxide can adsorb and remove sulfate ions in brine by contacting with sulfate ion containing brine under an acidic condition. In order to keep the brine in an acidic condition, acid such as hydrochloric acid, nitric acid or the like is added to the brine. Since alkali or alkaline earth metal chloride exists in brine, hydrochloric acid is preferably used.

The acidity at the sulfate ion adsorbing time is ordinarily set to pH 1 to 5, preferably pH 2 to 3. In general, the pH value in the sulfate ion adsorbing step using zirconium hydroxide is preferably set to a lower value because the adsorption amount of sulfate ions is increased and the adsorption rate is also increased.

However, when the pH value is lower than pH 1, zirconium hydrous oxide carried in the ion exchange resin may be dissolved in the brine, and discharged to the outside of the system, so that the adsorption capability is lowered and thus the treatment of the brine cannot be stably performed. In addition, the cost is increased, and this is unfavorable industrially. When sodium chlorate is contained in brine, it may be partially discomposed into chlorine gas and chlorine dioxide, and the ion exchange resin may be deteriorated by these elements.

On the other hand, when the pH value is higher than 5, the adsorption amount of sulfate ions is reduced and a resin amount which is required to adsorb a predetermined amount of sulfate ions is increased, and this is unfavorable. Furthermore, in Japanese laid-open Patent Application No. Hei-3-153522, the sulfate ion adsorbing and removing treatment using zirconium hydroxide powder is carried out at pH value of 3 to 6. On the other hand, this invention uses ion exchange resin, and thus even when a part of zirconium hydrous oxide is dissolved, the functional groups of the ion exchange resin can capture occurring zirconium ions again if the pit value is above 1, so that zirconium hydrous oxide can be prevented from being discharged to the outside of the system. Therefore, the sulfate ion adsorbing treatment can be performed at a lower pH value, and the adsorption efficiency can be enhanced in combination with the effect of the dispersive contact in a fluid and slurry state.

According to the present invention, in the chloride ion removing process after the adsorbing process is completed, the treated brine is removed from the bath, and the granular ion exchange resin is washed under an acidic condition with aqueous solution to withdraw chloride ions which are attached to the surface of the resin and the inside of the resin. This treatment is varied in accordance with the dispersive contact mode under the fluid state. The aqueous solution used in the chloride ion removing step is ordinarily acidic water or acidic dilute brine, and its pH value is equal to or lower than the pH value in the adsorbing step. Specifically, the pit value is set to 1 to 5, and preferably set to 1.5 to 2.5. When the pH value in the chloride ion removing step is higher than the pH value in the adsorbing step, it is unfavorable because the adsorbed sulfate ions are partially desorbed. This is because the sulfate ion adsorption capability of zirconium hydroxide is lowered as the pH value is high. The chloride ion removing step as described above has not been hitherto used in the process of removing sulfate ions from brine, and it is the present invention that proposes the use of the chloride ion removing step in the sulfate ion removing process. With this step, the raw material chlorides such as sodium chloride, etc. which are main components in brine can be withdrawn, and this step is in conformity with the severe chloride ion discharge regulation. Therefore, this method is effective industrially.

In the invention, acidic water having the pH value as described above can be used as the aqueous solution of the chloride ion removing step. On the other hand, when sulfate ions are adsorbed with non-carry type powdery zirconium hydrous oxide as disclosed in Japanese Laid-open Patent Application No. Hei-3-153522, a washing process of zirconium hydrous oxide needs washing aqueous solution in which salt of about 0.2 or more in normality is beforehand dissolved. This is because zirconium hydrous oxide become finely granular and colloidal by a phenomenon which is called as peptization, so that it is hardly separated from brine to be treated. However, according to the chloride ion removing step of the present invention, no peptization occurs even when no salt is added, and thus the washing process can be easily performed. The cause for this is unclear, however, it is presumed that the functional groups of the ion exchange resin have an electrical action having a peptization suppressing effect on the carried zirconium hydrous oxide.

In the desorbing step of the present invention, sulfate ions which are adsorbed by zirconium hydroxide carried in the granular ion exchange resin are desorbed after the adsorbing step and the chloride ion removing step to reproduce the sulfate ion adsorbing capability of the granular ion exchange resin carrying zirconium hydrous oxide. The desorption can be performed in the same manner as the adsorbing step, that is, by dispersively contacting the granular ion exchange resin with solution in a fluid state at a pH value higher than the pH value of the adsorbing step. As the aqueous solution may be used aqueous solution containing water and soluble alkaline metal salt. The sulfate ion desorbing step of the present invention is ordinarily carried out at PH value of 5 to 10, preferably 8 to 9. When the pH value is lower than 5, the sulfate ion desorption efficiency is low. On the other hand, when the pH value is higher than 10, the amount of sodium ions which react with zirconium hydroxide increases, and thus the material unit of acidic addition agent or alkali addition agent such as hydrochloric acid or sodium hydroxide which are used in the adsorbing and desorbing steps is increased. Therefore, this case is unfavorable. In order to keep the pH value of the desorption step in a predetermined range, alkali agent such as sodium hydroxide is ordinarily added.

After the desorbing step, the aqueous solution is discharged from the treatment area in the normal dispersive contact mode like the process after the adsorbing step or after the chloride ion removing step, and a desorption water washing treatment is carried out. In the desorption water washing step, the granular ion exchange resin is washed with water to withdraw sulfate ions attached on the surface of the resin and the inside of the resin. In the desorption water washing step, the pH value is set to be equal to or lower than the pH value in the desorbing step, and it is set to pH 5 to 10, preferably pH 6 to 8. When the pit value is lower than 5, sulfate ions existing inside of the resin and on the surface of the resin are adsorbed and thus the washing efficiency is reduced. On the other hand, when the pH value is higher than 10, the use amount of acidic addition agent or alkali addition agent such as hydrochloric acid or sodium hydroxide which are used in the adsorbing and desorbing steps increases like the desorbing step, and thus the material unit is increased. Accordingly, this case is unfavorable.

The dispersive contact in the fluid state can be performed in various manners, for example, (1) by using the rotational force providing means such as a stirrer or the like, (2) by introducing gas bubbles, and (3) by forming a fluidized bed of a packed column in which brine to be treated is introduced to flow through the packed column filled with granular ion exchange resin carrying zirconium hydrous oxide so that the granular ion exchange resin is fluidized.

Next, each of these manners will be described.

First, (1) the manner using the rotational force providing means will be described.

A stirrer is representatively used as the rotational force providing means. However, in place of the stirrer, fluid may be introduced at a predetermined flow velocity in a tangential direction of a cylindrical treatment bath to keep the inside of the bath in a fluid state. In this invention, it is necessary to prevent a mechanical member of the rotational force providing means from being directly contacted with the granular ion exchange resin This is because the granular ion exchange resin carrying zirconium hydrous oxide may be pulverized by crushing or the like, so that the treatment thereof may be cumbersome, and the adsorption and desorption operation is required to be stably and smoothly performed for a long time. Therefore, the mechanical member such as stirring vanes, etc. must be inhibited from being disposed in a dispersive contact treatment area where brine containing sulfate ions and zirconium hydrous oxide carrying ion exchange resin are dispersively contacted with each other. In order to satisfy this requirement, a liquid-permeable partition member such as a mesh or the like through which liquid (brine in the adsorbing step and aqueous solution in the desorbing step) can flow is disposed at at least a part of the inside of the treatment bath so as to partition the inside of the treatment bath into a slurry section area where the granular ion exchange resin carrying zirconium hydrous oxide is held, and a non-slurry section area where no granular ion exchange resin carrying zirconium hydrous oxide is held.

The ratio of the liquid-permeable section area to the liquid non-permeable section area in the partition member is not limited to a specific value, and it may be suitably determined in accordance with the volume of the treatment bath, the flow amount of brine to be treated, the operation conditions for the ion exchange resin concentration, etc. in the slurry insofar as the flow of the fluid which is produced by the stirring vanes disposed in the non-slurry section area can be transmitted to the slurry section area through the fluid-permeable portion of the partition member, and the granular ion exchange resin carrying zirconium hydrous oxide can be dispersively contacted with the flow of the brine in the fluid state.

The liquid-permeable portion may be formed of a porous plate such as a mesh member or a porous member, and its opening hole diameter is set to be smaller than the particle diameter of the granular ion exchange resin which is held in the slurry section area to prevent the granular ion exchange resin from being contaminated into the non-slurry section area. When the mesh member is used, it may be reinforced by a grid-type supporter having large mechanical strength. The materials of the porous plate and the supporter are not limited to specific ones, however, metal or plastic materials having brine resistance may be suitably used.

Figure 2:
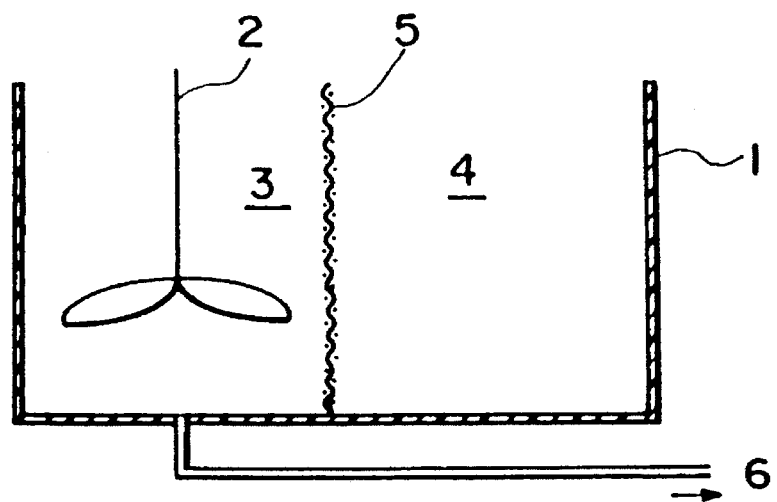
FIG. 2 is a diagram showing a two-chamber vertically split bath in the embodiment of the present invention.
Figure 3:
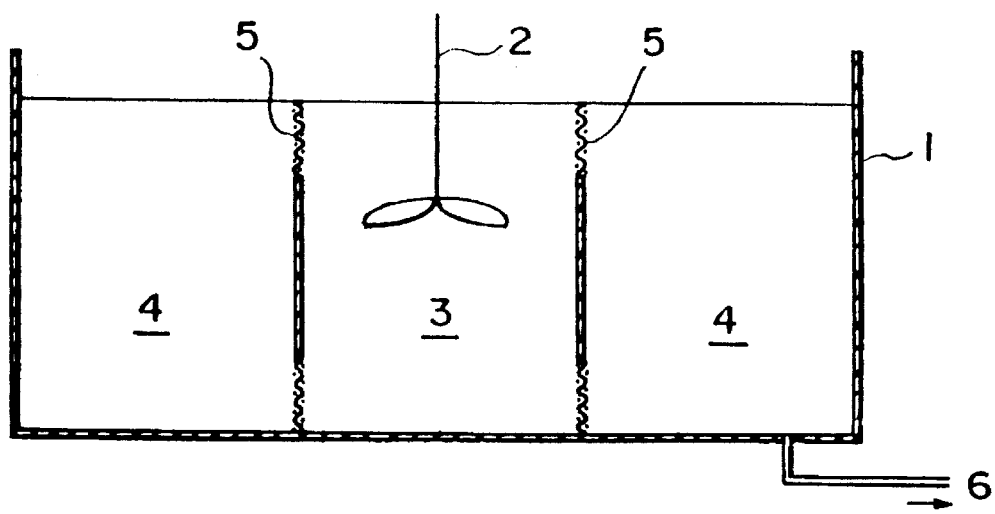
FIG. 3 is a diagram showing a three-chamber vertically split bath in the embodiment of the present invention.

Any one of longitudinal partition, lateral partition and oblique partition may be used to partition the inside of the bath. The number of partitioned areas is not limited to a specific one, and usually the inside of the bath is preferably partitioned into two or three areas. In this case, one of the partitioned areas is used as the slurry section area. Furthermore, the volume ratio of the slurry section area and the non-slurry section area is not limited to a specific value. Specifically, the partition of the treatment bath is performed in the manners as shown in FIGS. 1 to 3. That is, FIG. 1 shows a horizontal partition case, FIG. 2 shows a vertical partition case, and FIG. 3 shows a three-partitioning case. In these figures, a stirring bath 1 is partitioned into a non-slurry section area 3 and a slurry section area 4 by a partition member 5 (a part thereof is formed of a mesh member 6), and the stirring vanes are disposed in the non-slurry section area 3. The granular ion exchange resin carrying zirconium hydrous oxide is accommodated in the slurry section area 4. When the stirring vanes 2 are rotated, the brine in the non-slurry section area is rotated by the stirring vanes and flow of the brine occurs. The brine in the non-slurry section area flows through the mesh member 6 into the slurry section area, whereby both brine and granular ion exchange resin in the slurry section area are simultaneously moved and fluidized by the flow of the brine from the non-slurry section area. The shape of the treatment bath is not limited to a specific one, however, such a shape that the slurry can be kept in an uniform and fluid state is preferable. Usually, a cylindrical bath is used.

Next, the gas bubble introducing manner (2) will be described.

In this manner, the fluid state is formed by introducing gas such as air, nitrogen gas or the like which are not associated with the adsorption treatment and the desorption treatment, into the treatment area where granular ion exchange resin carrying zirconium hydrous oxide and brine or aqueous solution are accommodated. In this invention, the introducing manner of gas bubbles is not limited to a specific one, and various methods may be used. It is usually adopted that introduced gas such as air is pressurized by a compressor or the like and then passed through nozzles or a porous plate disposed at a predetermined position in the treatment bath. In place of this manner, gas such as air or the like may be physically dissolved and saturated in the liquid which is discharged and branched, and then circulated in the treatment bath again to produced gas bubbles in the treatment bath.

Figure 4:
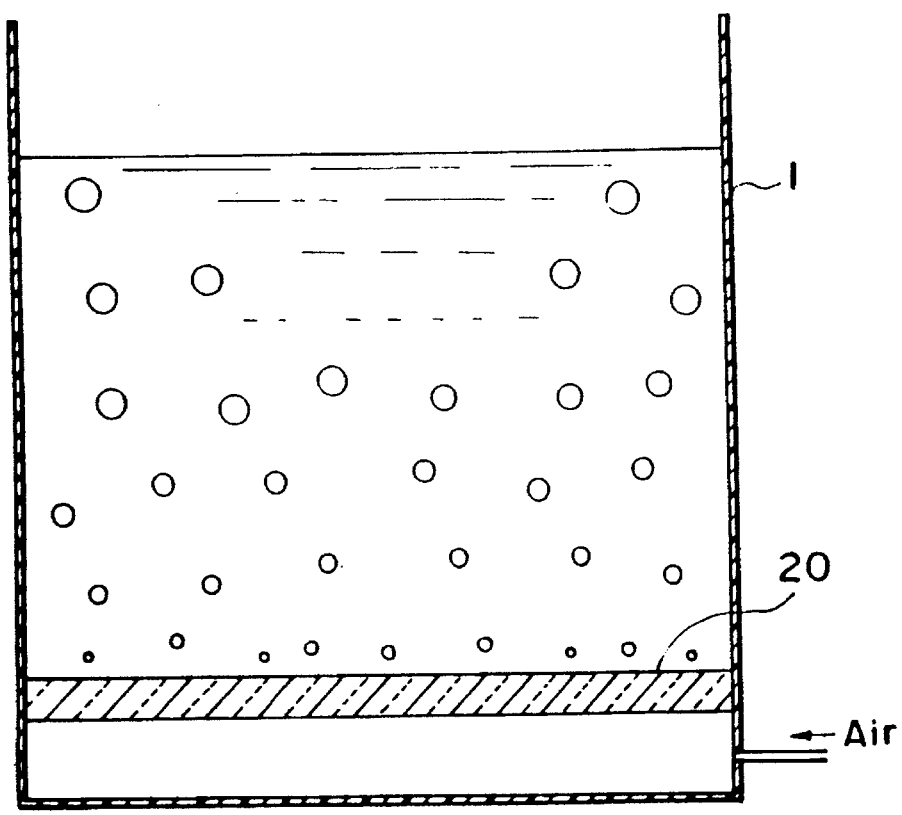
FIG. 4 is a diagram showing a treatment bath in which air is blown onto the whole surface of the lower portion of the bath.

In this case, the gas bubble introduction may be performed at the whole portion in the treatment bath, or partially performed at a predetermined area in the treatment bath. That is, any manner may be used to introduce gas bubbles insofar as the granular ion exchange resin carrying zirconium hydrous oxide is uniformly dispersed together with the brine or aqueous solution and kept in a slurry form. Specifically, a gas bubble introducing manner as shown in FIG. 4 is used. In FIG. 4, gas bubbles are introduced the whole portion of the treatment bath through a gas dispersing porous plate 20 disposed at the bottom portion of the treatment bath 1. The gas is ordinarily introduced under a pressure state. The gas dispersing porous plate 20 may be designed in the same structure as the porous plate of the liquid-permeable portion of the partition member in the treatment bath as described above (1), and the opening hole diameter thereof is set to be smaller than the particle diameter of the granular ion exchange resin. The introduced gas bubbles such as air or the like ascends in the liquid to produce upflow, so that the liquid containing the granular ion exchange resin is kept to the fluid state, and the granular ion exchange resin can be uniformly dispersed in the liquid. The amount of the gas to be introduced into the treatment bath can be suitably determined in accordance with the gas blow-in position, the internal structure of the treatment bath, the permissible amount of expansion of liquid (gas holdup), etc. Usually, it is preferably set to 500 to 10000 m$^3$/hour per liquid area of 1 m$^2$ of the treatment bath. When the gas amount is smaller than 500 m$^3$/hour·m$^2$ liquid area, the fluidizing effect of the gas bubbles is insufficient. On the other hand, when the gas amount is larger than 10000 m$^3$/hour·m$^2$ liquid area, not only the liquid expansion is excessively large, but also the gas amount increases with little effect.

Finally, the manner of allowing the brine into the packed bed filled with the granular ion exchange resin carrying zirconium hydrous oxide to fluidize the system, that is, the manner of forming the fluidized bed of the packed layer will be described.

The fluidized bed of the packed column of the present invention can be formed in the same manner as a conventional fluidized bed for a contact catalysis reaction or the like. For example, a partition plate comprising a perforated plate and/or a mesh member is disposed at each of the lower and upper portions of a reaction column which is a contact treatment area, and granular ion exchange resin carrying zirconium hydrous oxide is filled between the upper and lower partition plates. The lower partition plate supports the granular ion exchange resin carrying zirconium hydrous oxide and the upper partition plate prevents the flow-out of the granular ion exchange resin carrying zirconium hydrous oxide, whereby the packed column is formed. Brine in the adsorbing step, acidic aqueous solution in the chloride ion removing step, aqueous solution in the desorbing step and aqueous solution in the desorption water washing step are respectively introduced through the lower partition plate into the packed layer thus formed using a pump while flowing upwardly. On the other hand, the treated brine, the aqueous solution, etc. which are passed through the upper partition plate are discharged to the out side of the system, and transmitted to a predetermined electrolytic cell or a wastewater treatment system. Alternatively, a predetermined component is added to these solution, and then recirculated into the bath by the pump to form a fluidized bed.

Figure 5:
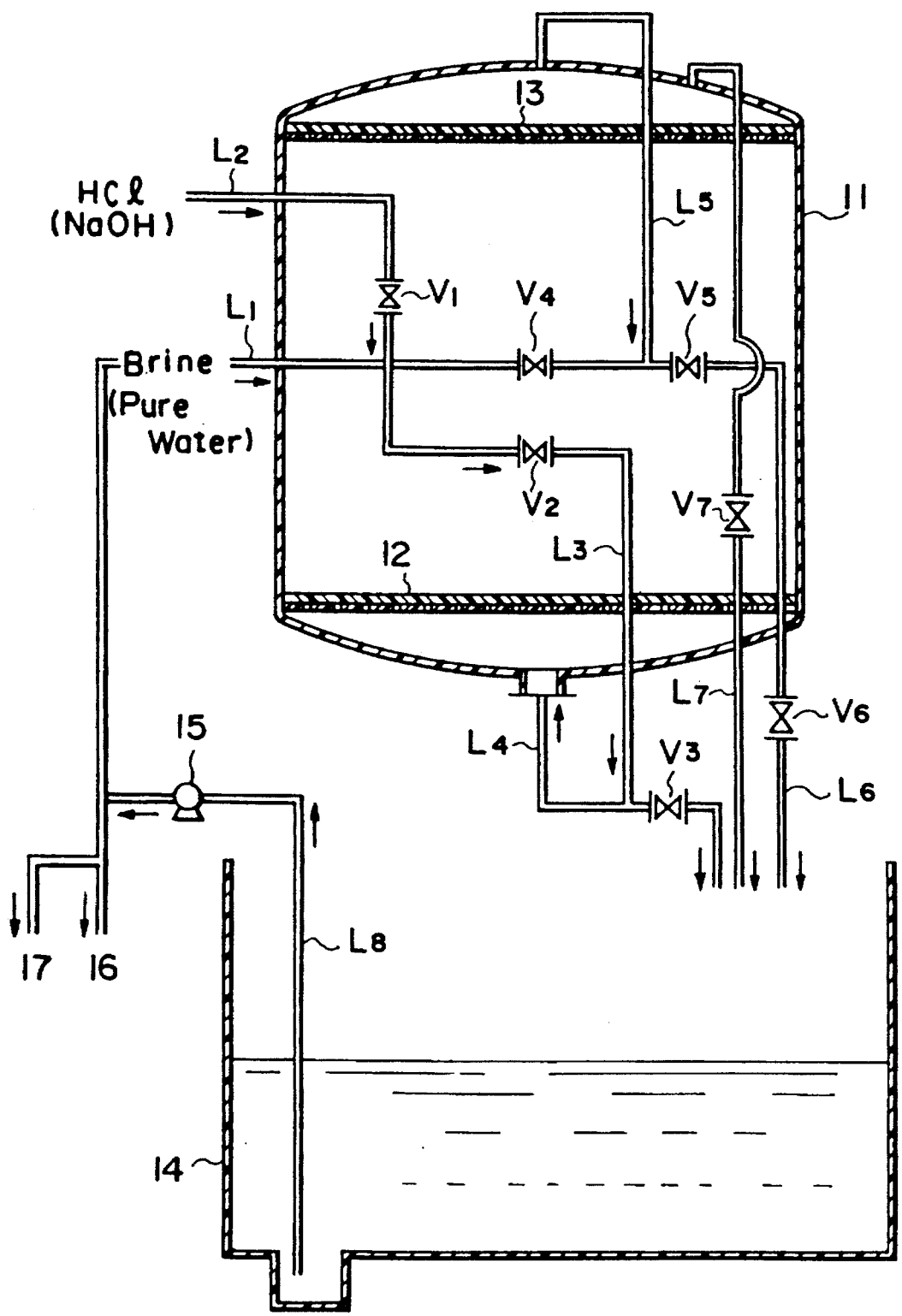
FIG. 5 is a diagram showing a packed column in the embodiment of the present invention.

FIG. 5 shows an embodiment of the recirculating bath as described above.

In FIG. 5, an upper partition plate 13 and a lower partition plate 12 each of which is formed by combining a perforated plate and a porous member are disposed at the upper and lower portions of a contact treatment area in a packed column 11, and granular ion exchange resin carrying zirconium hydrous oxide is filled between the upper and lower partition plates 13 and 12. The lower partition plate 12 supports the granular ion exchange resin carrying zirconium hydrous oxide, and the upper partition plate 13 prevents the flow-out of the granular ion exchange resin carrying zirconium hydrous oxide, thereby forming the packed column. Furthermore, a circulating bath 14 is disposed at the lower side of the packed column 11, and a circulating pump is provided to circulate brine in the circulating bath 14 into the packed column 11.

In addition, automatic valves V1 to V7 are disposed in the packed column, a predetermined amount of sulfate ion containing brine is supplied into the circulating bath 14, the circulating pump 15 is actuated, and the automatic valves V1 to V7 are controlled so that the brine is allowed to flow from a line L8, the circulating pump 15 and a line L1 through the automatic valve V2, a line L3 and a line L4, and then passed from the lower portion of the packed column 11 through the packed column to the upper portion of the packed column, thereby forming the fluidized bed. Furthermore, the brine is dispersively contacted with the granular ion exchange resin carrying zirconium hydrous oxide to perform the adsorption treatment on the brine. The brine which has been subjected to the adsorption treatment is returned from the upper portion of the packed column 11 through a line L5, the automatic valve V5, the automatic valve V6 and a line L6 to the circulating bath 14, thereby forming a circulating system. The acidic additive agent such as hydrochloric acid or the like is passed through a line L2 and the automatic valve V1, and joins the line L1 to be added to the brine, whereby the pH value in the fluidized bed is kept to a predetermined value. After the adsorption treatment is completed, the automatic valves V1 to V7 are opened so that all the brine in the packed column 11 flows out into the circulating bath 14, and then withdrawn into a brine system 16 by the circulating pump 15.

Subsequently, pure water is introduced from the line L1 in place of brine, and at the same time acidic agent such as hydrochloric acid or the like is introduced from the line L2 to circulate the acidic aqueous solution, so that the fluidized bed is formed, and the ion exchange resin and the brine attached to the inside of the ion exchange resin are washed to remove chloride ions.

After the chloride ion removing step, in place of the acidic aqueous solution, alkali agent such as sodium hydroxide is added from the line L2 at the chloride ion removing time to supply a predetermined amount of aqueous solution having a predetermined pH value into the circulating bath 14, and aqueous solution for desorption is allowed to flow from the lower portion of the packed column 11 to the upper portion of the packed column 11 in the same manner as the adsorbing step and the chloride ion removing step to thereby form the fluidized bed and perform the desorption treatment of sulfate ions which are adsorbed by the zirconium hydrous oxide carried on the granular ion exchange resin. After the desorption treatment is completed, the aqueous solution in the packed column 11 is allowed to flow out into the circulating bath 14 in the same manner as described above, and then discharged into a discharge system 17 by the circulating pump 15. Subsequently, in order to perform the desorption washing step, pure water is supplied from the line L1 in the same manner, and the alkali agent or acidic agent is added and circulated from the line L2 to set the pH value to a predetermined pH value, there by forming the fluidized bed and performing a washing treatment after the desorption treatment. The adsorbing step, the chloride ion removing step, the desorbing step and the desorption washing step as described above are successively repeated if necessary, whereby the brine is treated to remove sulfate ions in the brine.

The packed column forming the packed column is not limited to a specific one, and a general columnar shape such as a cylindrical shape, a pillar shape or the like may be used. Usually, a cylindrical packed column is preferably used because it can be easily formed and the fluid state can be uniformly kept. Any material may be used as the material of the packed column insofar as it has large mechanical strength and corrosion resistance against the brine to be treated under the use condition and the aqueous solution used to desorb sulfate ions. Usually, a hard rubber coated steel, FRP resin, titanium or the like is used. Furthermore, the number of packed column is not limited to a specific one, that is, only one packed column or plural (two or more) packed column may be used. When plural packed columns are used, these packed column may be arranged in series or in parallel, and it is suitably selected in accordance with treatment conditions such as the amount of brine to be treated, the capacity of the packed column, etc. When two or more packed columns are arranged in parallel, these packed column are time-sequentially switched to continuously perform the respective processes.

In order to fluidize the granular ion exchange resin carrying zirconium hydrous oxide and form the fluidized bed, the flow amount of the brine or aqueous solution which is introduced through the lower partition plate is set to about 20 to 200 in space velocity (1/Hr or $HF^{-1}$). When the space velocity is lower than 20/Hr, no stable and uniform fluidized bed can be formed. Furthermore, the flow amount of the liquid is small, so that the brine which has a low pH value and has high acidity is introduced in the adsorbing step and thus it is directly contacted with the granular ion exchange resin without being dispersed. Therefore, the zirconium hydrous oxide is dissolved and a caustic alkali consumption reaction by aqueous solution having high alkalinity occurs. Accordingly, this case is unfavorable. On the other hand, when the space velocity is higher than 200/Hr, a large-capacity packed column is required, and a pump having large power is also required, so that the facility cost rises up.

According to the present invention, in the treatment area in the fluid state thus formed, the sulfate ion adsorbing step of adsorbing sulfate ions in brine can be performed under an acidic condition by supplying a predetermined amount of brine to each treatment area and dropping acidic agent such as hydrochloric acid or the like for a predetermined time while forming the fluid state. Furthermore, the chloride ion removing step of withdrawing chloride ions which are adsorbed materials of the raw material chloride after the adsorption, the sulfate ion desorbing step of desorbing adsorbed sulfate ions and the adsorption washing step of washing and removing residual sulfate ions after the desorption are performed while the pH value is controlled to the above value by supplying a predetermined amount of aqueous solution such as pure water or the like to each treatment area and dropping acidic agent such as hydrochloric acid or alkali agent such as sodium hydroxide or the like while forming the fluid state.

According to the present invention, the respective steps may be performed using only a single treatment bath, or may be separately performed using respective individual treatment baths. When the single treatment bath is used, the slurry in the treatment area is kept to a fluid state by each manner, and the sulfate ion adsorption treatment, the chloride ion removing treatment, the desorption treatment and the washing can be successively performed. When plural treatment baths are used, the adsorption treatment, the chloride ion removing treatment, the desorption treatment and the desorption water washing treatment may be time-sequentially performed while switching one step to another step continuously.

In the case of the fluidizing manners (1) and (2) as described above, the volume of the treatment bath is suitably determined in accordance with the operation conditions such as the amount of sulfate ions to be removed, the sulfate ion adsorption capability of zirconium hydrous oxide, the sulfate ion adsorption velocity, the difference between the single treatment bath and each of the treatment baths in the individual treatment manner, the time of one cycle from the start of the adsorption until the end of the desorption. Usually, the volume of the treatment bath is preferably set to three to 30 times of the volume of the used granular ion exchange resin. When the volume of the treatment bath is smaller than three times of the volume of the granular ion exchange resin, it is difficult to fluidize. On the other hand, when the volume of the treatment bath is larger than 30 times, the removing rate of sulfate ions is reduced, and a large-capacity treatment bath is required, so that the facility cost is increased.

In the case of the fluidizing manner (3) as described above, the volume of the packed tower can be also suitably determined in accordance with the respective operation conditions such as the amount of sulfate ions to be removed, the sulfate ion adsorbing capability of zirconium hydrous oxide, etc. Usually, it is preferably set to 1.2 to 3 times of the volume of the used resin. When the volume of the packed tower is smaller than 1.2 time of the volume of the granular ion exchange resin, it is difficult to form and maintain a stable fluidized bed. On the other hand, when the volume of the packed tower is larger than 3 times, a packed tower of large volume is required, so that the facility cost is increased.

According to the present invention, the treatment temperature at which the granular ion exchange resin carrying zirconium hydrous oxide is set to the fluid state and subjected to the adsorption and desorption treatment is not limited to a specific value, and the treatment may be performed in the range of 0° to 100° C. When the treatment temperature is higher, it is preferable because the adsorption and desorption velocity is high.

In the present invention, when the fluidizing methods (1) and (2) are performed using a single treatment bath, after each treatment step is completed, the treated water such as treated brine or the like is discharged from the lower portion of the treatment bath to the outside, and withdrawn. In this case, the treated water is preferably discharged from a predetermined liquid discharge port so that it has no damage on the granular ion exchange resin. It is needless to say that the treated brine should be discharged as perfectly as possible.

When the method of forming the fluid state with the packed column is used and a single bed is used, like the case of the treatment bath as described above, the treated aqueous solution such as treated brine is temporarily discharged from the packed column, and then a next step is performed. Alternatively, aqueous solution such as brine to be treated is introduced while being switched. It is more preferable on efficiency to temporarily discharge treated aqueous solution of a previous treatment step.

As described above, when a single treatment bath or a packed column is used, sulfate ions can be efficiently removed from brine stably and economically by repeating the following cycle: adsorbing step—chloride ion removing step—desorbing step—desorption water washing step—adsorbing step, or the respective steps are continuously performed using individual and separate treatment baths, packed column and a water washing bath.

According to the method of treating brine, sulfate ions in brine are adsorbed and removed using granular ion exchange resin carrying zirconium hydrous oxide, so that the treatment operation can be more remarkably simplified as compared with the case where zirconium hydrous oxide is directly used. Furthermore, the granular ion exchange resin carrying zirconium hydrous oxide is dispersively contacted with brine in the fluid state without being contacted with the mechanical member, so that the resin can be prevented from being crushed, and the contact efficiency and the removing efficiency of sulfate ions can be more improved as compared with the case where zirconium hydrous oxide carrying ion exchange resin is contacted with brine in a fixed state. Furthermore, there is little elution loss of zirconium hydroxide, and the pH value at the adsorption and desorption treatment time can be easily controlled. Accordingly, hydrochloric acid and sodium hydroxide which serve as pit adjustment agent can be prevented from being wasted, and thus this method is favorable industrially.

Furthermore, by providing the chloride ion removing step after the adsorption step, the raw material alkali or alkaline earth metal chloride such as sodium chloride or the like which is discharged from the desorption-treated liquid to the outside can be reduced, and thus this method is favorable industrially and in terms of the physical environment of the earth. Particularly, since zirconium hydrous oxide is carried on the gel-type ion exchange resin, the discharge amount of the raw material chloride can be further reduced.

EXAMPLES

The present invention will be described in detail with preferred embodiments, however, the present invention is not limited to the embodiments as described below.

[Embodiment 1]

The treatment bath was designed in the same structure as shown in FIG. 1. That is, the treatment bath 1 of this embodiment was constructed by a cylindrical body of 200 mm diameter and 500 mm height, which was formed of acrylic resin and had a bottom portion. A partition member was disposed at 200 mm height from the bottom portion, and it comprised a mesh member 5 which was formed of polypropylene and had an opening diameter of 300 μm, and two gaskets each of which was formed of EPDH (ethylene propylene rubber) having 2 mm thickness and disposed so as to sandwich the mesh member 5 therebetween. The inside of the treatment bath was partitioned into two section areas by the partition member.

Zirconium hydroxide was carried on strongly acidic cation exchange resin by the following method to prepare granular ion exchange resin (particles) oil which zirconium hydrous oxide was carried. That is, 2-liter cation exchange resin produced by Mitsubishi Chemical Industries Ltd, (Trade name: Diaion PK216; average particle diameter: 740 μm) was supplied into a vessel of polypropylene, and 4-liter zirconium oxychloride solution of 2 molar concentration (M) was also poured into the vessel. Thereafter, the cation exchange resin was immersed in the zirconium oxychloride solution for two hours while stirred sometimes. The zirconium oxychloride solution was removed by decantation, and then washed five times with 5-liter pure water. Subsequently, the cation exchange resin which had been subjected to the immersion treatment was poured into 8-liter sodium hydroxide solution of 2H, and it was immersed for one hour while stirred sometimes. The sodium hydroxide solution was removed by decantation, and then washed five times with 5-liter pure water. The fifth washing water was not discarded, and densified hydrochloric acid was dropped into the washing water until the pH value was equal to 2.5. Thereafter, the solution was removed by decantation, and then the immersion treatment using 2M zirconium oxychloride solution, the water washing treatment, the immersion treatment using 2M sodium hydroxide solution, the water washing treatment and the acidification treatment to pH 2.5 with densified hydrochloric acid were repeated to prepare granular cation exchange resin carrying zirconium hydrous oxide.

The granular cation exchange resin carrying zirconium hydrous oxide thus prepared was stocked in the upper section area of the treatment bath. Furthermore, a compact stirrer (produced by Yamato Science Corporation, Trade name: Labo Stirrer Model-51B, motor 100W) was mounted in the lower section area of the treatment bath so that four stirring vanes of 7 cm diameter were disposed at 5 cm height from the bottom portion.

10-liter sulfate-ion contained brine (Containing NaGl 200 g/liter, $Na_2SO_4$ 8 g/liter) was poured into the treatment bath, and it was stirred for 60 minutes under the following conditions: temperature of 70° C., pH 2.1 to 2.2, stirring speed of 500 rpm, so that the whole liquid in-the treatment bath was fluidized and the granular ion exchange resin in the upper section area was kept in an uniformly dispersive state, thereby performing an adsorption treatment. The pH value in the treatment bath was kept to a predetermined value by dropping densified hydrochloric acid into the treatment bath. With this operation, 12 g of sulfate ions could be adsorbed per 1-liter ion exchange resin.

Subsequently, the treated brine was discharged from the lower portion of the treatment bath, and pure water of 2.5 liters which was kept at pH 2.0 and at 70° C. was scattered from the upper side of the resin (watering) to wash and remove chloride ions from the resin. Thereafter, pure water of 10 liters was added, and desorption was performed under the condition: temperature of 70° C., pH 9.0 to 9.5 and stirring speed of 500 rpm while stirred for 120 minutes. 32 wt % NaOH was dropped into the treatment bath to keep the pH value. With this operation, all the adsorbed sulfate ions were desorbed. After the desorption treatment, the liquid was discharged from the lower portion of the treatment bath.

The cycle of the adsorption step, the water washing step, the desorption step and the water washing step was repeated ten times, and then the ion exchange resin was observed through a microscope. Through the observation, no crush was found out. The weight ratio of the salt of the desorbed liquid and the sulfate ions was equal to 1.50 on the average for the 10 cycles.

[Comparison example 1]

The cycle of the adsorption step, the water washing step, the desorption step and the water washing step was repeated at 10 times on sulfate-ion contained brine in the same manner as the embodiment 1, except that the inside of the treatment bath was not partitioned by the mesh member. As a microscopic observation result, much crushed resin was found out.

[Embodiment 2]

The cycle of the adsorption step, the water washing step, the desorption step and the water washing step was repeated at 10 times on sulfate-ion contained brine using the same device and same condition as the embodiment 1, except that as the ion exchange resin was used 2-liter cation exchange resin produced by Mitsubishi Chemical Industries Ltd. (Trade name: Diaion WK-20, average particle diameter: 740 g m). As a microscopic observation result, no crush was found out.

[Comparative example 2]

The cycle of the adsorption step, the water washing step, the desorption step and the water washing step was repeated at 10 times on sulfate-ion contained brine in the same manner as the embodiment 2, except that the inside of the treatment bath was not partitioned by the mesh member. As a microscopic observation result, much crushed resin was found out.

[Embodiment 3]

The cycle of the adsorption step, the water washing step, the desorption step and the water washing step was repeated at 10 times on sulfate-ion contained brine using the same device and same condition as the embodiment 1, except that as the ion exchange resin was used 2-liter cation exchange resin produced by Mitsubishi Chemical Industries Ltd. (Trade name: Diaion CR10, average particle diameter: 740 μm). As a microscopic observation result, no crush was found out.

The cycle of the adsorption and desorption on sulfate ions was repeated ten times using the same condition and same device as the embodiment 1. As a microscopic observation result, no crush was found out.

[Comparative example 3]

The cycle of the adsorption step, the water washing step, the desorption step and the water washing step was repeated at 10 times on sulfate-ion contained brine in the same manner as the embodiment 3, except that the inside of the treatment bath was not partitioned by the mesh member. As a microscopic observation result, much crushed resin was found out.

[Embodiment 4]

An acrylic cylindrical member of 50 mm diameter and 500 mm height which has a bottom portion was used, and the treatment bath 1 was designed in the same construction as shown in FIG. 4. That is, an air dispersing device (sintered glass) 20 formed of glass porous member was disposed at 30 mm height from the bottom portion of the treatment bath. Granular cation exchange resin carrying zirconium hydrous oxide was prepared in the same manner as the embodiment 1.

70-milliliter granular cation exchange resin carrying zirconium hydrous oxide thus prepared was picked up and then used for testing.

The 70-milliliter granular ion exchange resin carrying zirconium hydrous oxide thus prepared was dispersively supplied into brine (NaCl 200 g/liter, $Na_2SO_4$ 8 g/liter) of 470 milliliters in an upper section area of the treatment bath 1 by the air dispersing device. Air was introduced at a flow rate of 1 $m^3$/hour from the lower portion of the treatment bath by an air bomb. The introduced air was shaped into fine gas bubbles, and the upper section area of the treatment bath was kept in a fluid state. Hydrochloric acid was dropped into the treatment bath to keep its pH value to pH 2.1 to 2.2, and the dispersive contact treatment was made at a temperature of 70° C. to 72° C. for 40 minutes so that sulfate ions were adsorbed by zirconium hydrous oxide on the ion exchange resin. With this adsorption treatment operation, sulfate ions of 11.0 g was adsorbed per 1-liter ion exchange resin. Furthermore, the concentration of zirconium ions in brine after the adsorption treatment was completed was equal to 0.3 ppm or less.

Subsequently, all the brine was discharged to the outside, and 80-milliliter pure water whose pH value and temperature was adjusted to pH 2.0 and 70° C. was scattered from the upper side of the resin (watering-) to wash and remove chloride ions from the resin. Thereafter, 240-milliliter pure water was poured into the treatment bath, and sodium hydroxide (32 wt % in concentration) was dropped into the treatment bath to keep the pH value at pH 8.5 to 9.0. Thereafter, air bubbles were introduced into the treatment bath at a temperature of 70° to 72° for 120 minutes in the same manner as described above to perform the dispersive contact treatment in the fluid state, whereby sulfate ions were desorbed from the ion exchange resin. With this desorption treatment operation, all the sulfate ions could be desorbed from the resin.

Thereafter, all the liquid was discharged to the outside, and the cycle of the adsorption treatment and the desorption treatment as described above was repeated at ten times. As a microscopic observation result, no crush was found out in the resin. Furthermore, the sulfate ion adsorbing and desorbing capability was substantially unvaried, and the average adsorption amount of sulfate ions for the 10 cycles was equal to 11.2 g per 1-liter ion exchange resin. The concentration of zirconium ions in brine after the adsorption step is completed was equal to 0.3 ppm or less in all cycles. The weight ratio of salt of desorption-treated liquid and sulfate ions was equal to 1.61 on the average for the 10 cycles.

[Comparative example 4]

0.6-liter granular cation exchange resin carrying zirconium hydrous oxide which was prepared in the embodiment 4 was picked up, and dispersively filled in 0.5-liter brine (NAGl 200 g/liter) containing no sulfate ion in an acrylic treatment bath having a bottom portion in which an air dispersing device was disposed like the embodiment 4. Further, a sintered glass was also disposed at the upper portion of the treatment bath to prevent the ion exchange resin from being fluidized, thereby forming a fixed bed with introducing no air. After the brine in the cylindrical body was discharged from the upper portion of the resin bed, 4-liter brine whose pH value was adjusted to pH 1 (NACl 200 g/liter, $Na_2SO_4$ 8 g/liter) was allowed to flow at a space velocity of 10/Hr, and the adsorption treatment was performed at a temperature of 70° to 72° C. With this operation, 8.5 g of sulfate ions were adsorbed per 1-liter ion exchange resin. The concentration of zirconium ions in the brine at the time when the adsorption treatment was completed was equal to 12 ppm.

After the adsorption treatment was completed, all the brine in the treatment bath was discharged to the outside. Thereafter, the resin in the treatment bath was dispersed in pure water, and a fixed bed was formed in the same manner as described above. Thereafter, 2-liter pure water was allowed to flow at a space rate of 10/Hr, and the desorption treatment of sulfate ions was performed at a temperature of 70° C. to 72° C. With this operation, 40% of adsorbed sulfate ions was desorbed.

Furthermore, sodium hydroxide was added to the same aqueous solution, and the solution was repetitively allowed to flow through the resin bed under the following condition:pH 12, space velocity of 10/Hr and temperature of 70° to 72° C. to thereby desorb sulfate ions. With this operation, all the adsorbed sulfate ions could be desorbed.

The cycle of the adsorption treatment and the desorption treatment as described above was repeated at ten times, and the resin was observed with a microscope. As a microscopic observation result, no crush was found out. However, the average adsorption amount of the sulfate ions for the ten cycles was equal to 8.6 g per 1-liter ion exchange resin, and the average concentration of zirconium ions in brine after the tenth adsorption treatment was completed was equal to 11.6 ppm.

[Comparative example 5]

In this example, no air dispersing device was disposed, but the same stirrer as the embodiment 1 was disposed in the cylindrical member having a bottom portion as the embodiment 4, thereby forming a treatment bath. Furthermore, stirring vanes were disposed in the treatment bath to stir solution in the treatment bath. 0.6-liter cation exchange resin carrying zirconium hydrous oxide which was prepared in the embodiment 4 was supplied into the treatment bath, and added with 4-liter brine having the same components as used in the embodiment 4. The solution was kept at pH 2.1 to 2.2 while added with hydrochloric acid, and it was stirred at a temperature of 70° C. to 72° C. for 40 minutes at a stirring speed of 500 rpm so that the sulfate ions were adsorbed by the resin. With this operation, 12 g of sulfate ions were adsorbed per 1-liter ion exchange resin. The concentration of zirconium ions in brine after the adsorption treatment was equal to 0.3 ppm or less.

After the adsorption treatment was completed, the brine in the treatment bath was discharged to the outside, and then 2-liter pure water was poured into the treatment bath. 32 wt % sodium hydroxide solution was added to keep the solution at pH 8.5 to 9.0, and the desorption treatment was performed at 70° C. to 72° C. for 120 minutes. With this operation, it was confirmed that all the sulfate ions were desorbed from the ion exchange resin.

After the desorption treatment, all the liquid in the treatment bath was discharged to the outside. The cycle of the adsorption and desorption treatments as described above was repeated at ten times, and then the ion exchange resin in the treatment bath was observed with a microscope. As the microscopic observation result, much crushed resin was observed.

[Embodiment 6]

A packed column 11 was formed with the same acrylic cylindrical member having a bottom portion as the embodiment 4 in such a packed column as shown in FIG. 6. That is, a lower partition plate 12 comprising an acrylic resin perforated plate and a mesh member of Saran having an opening diameter of 300 μm is disposed at the lower portion of the treatment bath 11. 0.6-liter strong acidic cation exchange resin carrying zirconium hydrous oxide which was prepared in the same manner as the embodiment 1 was filled on the partition plate 12, and further an upper partition plate 13 which was similar to the lower partition plate 12 at the lower side of the treatment bath was also disposed at the upper side of the treatment bath. Furthermore, an acrylic cubic circulating bath 14 having one side length of 17 cm was disposed at the lower side of the packed column 11, and 4-liter brine (NaCl 200 g/liter, $Na_2SO_4$ 8 g/liter) was poured into the circulating bath 14. Thereafter, the brine was supplied from the lower portion of the packed column 11 at a space rate (flow rate) of 55/Hr (with the volume of ion exchange resin fixed bed as a reference) using a circulating pump (produced by Iwaki Co., Ltd., Trade name: Magnet Pump MD type), thereby forming a fluidized bed in the packed column. With this operation, the volume of the fluidized bed was 1.3 times as large as the volume of the fixed bed. Furthermore, hydrochloric acid was added from the line L2 to keep the pH value of the fluidized bed to pH 2.1 to 2.2, and then the adsorption treatment was performed at 70° C. for 45 minutes.

With the above operation, 11.5 g of sulfate ions were adsorbed by 1-liter ion exchange resin. The concentration of zirconium ions in brine at the time when the adsorption treatment was completed was equal to 0.3 ppm or less. After the adsorption treatment, all the brine in the packed column was supplied to the circulating bath, and discharged to a brine system 16 at the outside of the system.

Subsequently, 0.9-liter pure water was supplied into the circulating bath 14, and hydrochloric acid was added from the line L2. The aqueous solution whose pH value and temperature were adjusted to pH 2.0 and 70° C. was circulatingly supplied from the line L1 into the packed column 11 at a flow rate of 75 liters/hour and circulated in the backed bed, thereby forming the fluidized bed, whereby the packed ion exchange resin was washed to remove chloride ions. After the chloride ion removing step, all the aqueous solution in the packed column was supplied to the circulating bath, and discharged to the brine system 16 at the outside of the system.

Thereafter, 2-liter pure water was further supplied into the circulating bath 14, and then supplied into the packed column by the circulating pump 15 in the same manner as the chloride ion removing step, thereby forming the fluidized bed. Furthermore, 32 wt % sodium hydroxide solution was added from the line L2 to keep the pH value of the fluidized bed to pH 8.5 to 9.0, and the desorption treatment was performed at 70° C. for 120 minutes. It was confirmed that with this operation, all the sulfate ions were desorbed from the ion exchange resin. After the desorption treatment, all the aqueous solution in the packed column was discharged to the circulating bath, and then discharged to a wastewater system 17 at the outside of the system. Thereafter, the same desorption washing treatment as the desorption treatment as described above was performed except that the pH value of the fluidized bed was set to pH 7 to 8. After the desorption washing treatment, all the aqueous solution in the packed column was supplied into the circulating bath, and then discharged to the wastewater system 17 at the outside of the system.

The cycle of the adsorption treatment, the chloride ion removing treatment, the desorption treatment and the desorption washing treatment was repeated ten times, and then the ion exchange resin was observed with a microscope. As a microscopic observation result, no crush was found out in the resin. Furthermore, the sulfate-ion adsorption and desorption capability was substantially unvaried. The sulfate-ion average adsorption amount for the ten cycles was equal to 11.7 g per 1-liter ion exchange resin. In addition, the concentration of zirconium ions in brine after the adsorption treatment was equal to 0.3 ppm or less in all the cycles. The weight ratio of the sodium chloride and the sulfate ions in the desorbed liquid was equal to 1.55 on the average for the 10 cycles.

[Comparative example 6]

The cycle of the adsorption treatment, the chloride ion removing and washing treatment, the desorption treatment and the desorption washing treatment was repeated on sulfate-ion contained brine at ten times in the same manner as the embodiment 5, except that 2-liter pure water whose pH value and temperature were adjusted to pH 6.8 and 70° C. was used in the chloride ion removing and washing treatment after the adsorption treatment. In this embodiment, no crush was found out, and the concentration of zirconium ions in brine after the adsorption treatment was equal to 0.3 ppm in all the cycles. Therefore, there was no problem. However, the weight ratio of the salt and the sulfate ions in the adsorbed liquid was equal to 2.1 on the average for the 10 cycles.

[Comparative example 7]

The cycle of the adsorption treatment, the desorption treatment and the desorption washing treatment was repeated on sulfate-ion contained brine at ten times in the same manner as the embodiment 5, except that no chloride ion removing and washing treatment was conducted after the adsorption treatment. In this case, no crush was found out in the resin and the concentration of zirconium ions in brine after the adsorption treatment was equal to 0.3 ppm in all the cycles, and thus there was no problem. However, the weight ratio of the salt and the sulfate ions in the adsorption-treated liquid was equal to 6.58 on the average for the 10 cycles.

[Embodiment 6]

Granular cation exchange resin was prepared by the same method as the embodiment 1, except that gel-type cation exchange resin produced by Mitsubishi Chemical Industries Ltd. (Trade Name: Diaion SK-1B, Average particle diameter: 750 μm) was used as the strong acidic cation exchange resin. The sulfate-ion adsorption treatment, the chloride ion removing treatment, the sulfate-ion desorption treatment and the desorption washing treatment were performed using the above exchange resin by the same device and the same operating conditions as the embodiment 5. With this operation, the sulfate-ion average adsorption amount for 10 cycles was equal to 9.8 g per 1-liter ion exchange resin. Furthermore, the concentration of zirconium ions in brine after the adsorption treatment was completed was equal to 0.3 ppm or less in all the cycles. The weight ratio of the salt and the sulfate ions in the desorption-treated liquid was equal to 1.25 on the average for the 10 cycles.

[Comparative example 8]

The cycle of the adsorption treatment, the desorption treatment and the desorption washing treatment was repeated on sulfate-ion contained brine at ten times in the same manner as the embodiment 6, except that no chloride ion removing treatment after the adsorption treatment was conducted. No crush was found out in the resin, and the concentration of zirconium ions in brine after the adsorption treatment was equal to 0.3 ppm or less in all the cycles. Accordingly, there was no problem. However, the weight ratio of the salt and the sulfate ions after the desorption treatment was equal to 5.48 on the average for the 10 cycles.

[Embodiment 7]

The granular cation exchange resin carrying zirconium hydrous oxide was prepared by the same method as the embodiment 1, except that gel-type cation exchange resin produced by Dow Chemical Company (Trade Name: Dowex HGR-W2, Average particle diameter: 750 μm) was used as the strong acidic cation exchange resin. The sulfate-ion adsorption treatment, the chloride ion removing treatment, the sulfate-ion desorption treatment and the desorption washing treatment were performed using the above exchange resin by the same device and the same operating conditions as the embodiment 5. With this operation, the sulfate-ion average adsorption amount for 10 cycles was equal to 9.1 g per 1-liter ion exchange resin. Furthermore, the concentration of zirconium ions in brine after the adsorption treatment was completed was equal to 0.3 ppm or less in all the cycles. The weight ratio of the salt and the sulfate ions in the desorption-treated liquid was equal to 1.15 on the average for the 10 cycles.

[Comparative example 9]

The cycle of the adsorption treatment, the desorption treatment and the desorption washing treatment was repeated on sulfate-ion contained brine at ten times in the same manner as the embodiment 7, except that no chloride ion removing treatment after the adsorption treatment was conducted. No crush was found out in the resin, and the concentration of zirconium ions in brine after the adsorption treatment was equal to 0.3 ppm or less in all the cycles. Accordingly, there was no problem. However, the weight ratio of the salt and the sulfate ions after the desorption treatment was equal to 5.31 on the average for the 10 cycles.

[Embodiment 8]

The granular cation exchange resin carrying zirconium hydrous oxide was prepared by the same method as the embodiment 1, except that gel-type cation exchange resin produced by Rohm & Haas Co. (Trade Name: Amberlite IR-124, average particle diameter: 730 μm) was used as the strong acidic cation exchange resin. The sulfate-ion adsorption treatment, the chloride ion removing treatment, the sulfate-ion desorption treatment and the desorption washing treatment were performed using the above exchange resin by the same device and the same operating conditions as the embodiment 5. With this operation, the sulfate-ion average adsorption amount for 10 cycles was equal to 9.3 g per 1-liter ion exchange resin. Furthermore, the concentration of zirconium ions in brine after the adsorption treatment was completed was equal to 0.3 ppm or less in all the cycles. The weight ratio of the salt and the sulfate ions in the desorption-treated liquid was equal to 1.12 on the average for the 10 cycles.

[Comparative example 10]

The cycle of the adsorption treatment, the desorption treatment and the desorption washing treatment was repeated on sulfate-ion contained brine at ten times in the same manner as the embodiment 8, except that no chloride ion removing treatment after the adsorption treatment was conducted. No crush was found out in the resin, and the concentration of zirconium ions in brine after the adsorption treatment was equal to 0.3 ppm or less in all the cycles. Accordingly, there was no problem. However, the weight ratio of the salt and the sulfate ions after the desorption treatment was equal to 5.23 on the average for the 10 cycles.

[Embodiment 9]

The granular cation exchange resin carrying zirconium hydrous oxide was prepared by the same method as the embodiment 1, except that gel-type cation exchange resin produced by Bayer Ag. (Trade Name: Lewatit S-100, average particle diameter: 740 μm) was used as the strong acidic cation exchange resin. The sulfate-ion adsorption treatment, the chloride ion removing treatment, the sulfate-ion desorption treatment and the desorption washing treatment were performed using the above exchange resin by the same device and the same operating conditions as the embodiment 5. With this operation, the sulfate-ion average adsorption amount for 10 cycles was equal to 8.9 g per 1-liter ion exchange resin. Furthermore, the concentration of zirconium ions in brine after the adsorption treatment was completed was equal to 0.3 ppm or less in all the cycles. The weight ratio of the salt and the sulfate ions in the desorption-treated liquid was equal to 1.19 on the average for the 10 cycles.

[Comparative example 11]

The cycle of the adsorption treatment, the desorption treatment and the desorption washing treatment was repeated on sulfate-ion contained brine at ten times in the same manner as the embodiment 8, except that no chloride ion removing treatment after the adsorption treatment was conducted. No crush was found out in the resin, and the concentration of zirconium ions in brine after the adsorption treatment was equal to 0.3 ppm or less in all the cycles. Accordingly, there was no problem. However, the weight ratio of the salt and the sulfate ions after the desorption treatment was equal to 5.50 on the average for the 10 cycles.

As is apparent from the above comparative experiments between the embodiments of the present invention and the comparative examples, according to the present invention, the granular ion exchange resin carrying zirconium hydrous oxide is fluidized without being directly contacted with the stirring vanes to perform a dispersive contact treatment between the granular ion exchange resin carrying zirconium hydrous oxide and sulfate-ion contained brine or aqueous solution, so that when the adsorption treatment and the desorption treatment are carried out, the adsorption and desorption treatments can be performed stably and for a long time without crushing the resin. On the other hand, when the resin is directly contacted with the stirring vanes, much resin is liable to be crushed by the stirring vanes, and thus it may be contaminated into brine. In addition, it is difficult to perform a stable treatment for a long time.

When the granular ion exchange resin carrying zirconium hydrous oxide is used in a fixed state, no crush occurs in the resin, however, zirconium ions are liable to be eluted out. Therefore, the sulfate-ion adsorption capability is reduced, and the treatment of brine cannot be stable performed. Furthermore, by performing the chloride ion removing washing treatment after the sulfate ions are adsorbed, the loss of salt of desorption-treated liquid which is discharged to the outside can be reduced. when aqueous solution has a pH value which is lower than that at the adsorption treatment time, the loss of the salt can be further reduced.

What is claimed is:

1. A brine treatment method of removing sulfate ions from sulfate-ion containing brine comprising the steps of:

(1) bringing sulfate-ion containing brine into dispersive contact with granular ion exchange resin carrying zirconium hydrous oxide thereon in a fluid state under an acidic condition, whereby the sulfate ions are adsorbed by the ion exchange resin and removed from the brine;

(2) washing the granular ion exchange resin with an aqueous solution whose pH value is equal to or lower than a pH value in said step (1) after said step (1), thereby removing chloride ions from the granular ion exchange resin;

(3) bringing, in a fluid state, the granular ion exchange resin adsorbing the sulfate ions in said chloride ion removing step into dispersive contact with an aqueous solution of pH value higher than the pH value in said step (1), thereby desorbing the adsorbed sulfate ions from the granular ion exchange resin; and (4) washing the granular ion exchange resin with water after said step (3).

2. The brine treatment method as claimed in claim 1, wherein the acidic condition in said step (1) is pH 1 to 5.

3. The brine treatment method as claimed in claim 1, wherein the acidic condition in said step (1) is pH 2 to 3.

4. The brine treatment method as claimed in claim 1 wherein the pH value in said step (2) is 1 to 5.

5. The brine treatment method as claimed in claim 4, wherein the pH value in said step (2) is 1.5 to 2.5.

6. The brine treatment method as claimed in claim 1, wherein the pH value in said step (3) is 5 to 10.

7. The brine treatment method as claimed in claim 6, wherein the pH value in said step (3) is 8 to 9.

8. The brine treatment method as claimed in claim 1, wherein the pH value in said step (4) is 5 to 10.

9. The brine treatment method as claimed in claim 8, wherein the pH value in said step (4) is 6 to 8.

10. The brine treatment method as claimed in claim 1, wherein said steps (1) to (4) are successively repeated.

11. The brine treatment method as claimed in claim 1, wherein said steps (1) to (4) are successively performed using only a single treatment bath.

12. The brine treatment method as claimed in claim 1, wherein said steps (1) to (4) are separately performed using respective individual treatment baths.

13. The brine treatment method as claimed in claim 1, wherein said granular ion exchange resin is composed of at least one material selected from the group consisting of strong acid type cation exchange resin, weak acid type cation exchange resin and chelate resin.

14. The brine treatment method as claimed in claim 13, wherein said granular ion exchange resin is of gel type.

15. The brine treatment method as claimed in claim 1, wherein the fluid state is formed by rotational force providing means such as a stirrer, and at least a part of the inside of a treatment bath is partitioned into two section areas by a fluid-permeable partition member, the granular ion exchange resin being disposed in one section area while stirring vanes of the stirrer being disposed in the other section area.

16. The brine treatment method as claimed in claim 1, wherein the fluid state is formed by introducing gas bubbles.

17. The brine treatment method as claimed in claim 1, wherein the fluid state is formed by introducing brine to be treated into a packed tower which is filled with the granular ion exchange resin.

* * * * *

UNITED STATES PATENT AND TRADEMARK OFFICE
CERTIFICATE OF CORRECTION

PATENT NO. : 5,578,218
DATED      : November 26, 1996
INVENTOR(S): MATSUOKA et al It is certified that error appears in the above-indentified patent and that said Letters Patent is hereby corrected as shown below:

Col. 2, line 15, "pit" should read --pH--.

Col. 4, line 66, "thereunder" should read --hereunder--.

Col. 7, line 45, "pit" should read --pH--; and
    line 63, "pit" should read --pH--.

Col. 8, line 63, "pit" should read --pH--.

Col. 15, line 6, "pit" should read --pH--; and
    line 53, "2H" should read --2M--.

Signed and Sealed this

Twenty-sixth Day of August, 1997

Attest:

BRUCE LEHMAN

*Attesting Officer*   *Commissioner of Patents and Trademarks*